United States Patent [19]
Weissert

[11] Patent Number: 5,915,841
[45] Date of Patent: Jun. 29, 1999

[54] COMPLIANT FOIL FLUID FILM RADIAL BEARING

[75] Inventor: Dennis H. Weissert, Sunland, Calif.

[73] Assignee: Capstone Turbine Corporation, Tarzana, Calif.

[21] Appl. No.: 09/002,690

[22] Filed: Jan. 5, 1998

[51] Int. Cl.⁶ .................................................. F16C 17/03
[52] U.S. Cl. ............................................................ 384/104
[58] Field of Search .................................. 384/104, 106, 384/103, 105

[56] References Cited

U.S. PATENT DOCUMENTS

| | | |
|---|---|---|
| 4,451,163 | 5/1984 | Glaser . |
| 5,427,455 | 6/1995 | Bosley . |
| 5,549,392 | 8/1996 | Anderson .................................. 384/104 |

Primary Examiner—Lenard A. Footland
Attorney, Agent, or Firm—Albert J. Miller

[57] ABSTRACT

A multi-segment radial bearing including a bushing with an interior bore having a plurality of anti-rotation retainers which are equally spaced and extend the axial length of the interior bore. The generally T-shaped retainers divide the interior bore of the bushing into a like plurality of lobes, with each lobe having a compliant foil and a foil underspring disposed between adjacent generally T-shaped retainers.

18 Claims, 3 Drawing Sheets

COMPLIANT FOIL FLUID FILM RADIAL BEARING

TECHNICAL FIELD

This invention relates to the general field of compliant foil fluid film bearings and more particularly to an improved multi segment compliant foil fluid film radial bearing.

BACKGROUND OF THE INVENTION

Compliant foil fluid film radial bearings are currently being utilized in a variety of high speed rotor applications. These bearings are generally comprised of a bushing, a rotating element such as a rotor or shaft adapted to rotate within the bushing, non-rotating compliant fluid foil members mounted within the bushing and enclosing the rotating element, and non-rotating compliant spring foil members mounted within the bushing underneath the non-rotating compliant fluid foil members. The space between the rotating element and the bushing is filled with fluid (usually air) which envelops the foils. Conventionally, the compliant fluid foil elements are divided into a plurality of individual compliant foils to form a plurality of wedge shaped channels which converge in thickness in the direction of the rotation of the rotor.

The motion of the rotating element applies viscous drag forces to the fluid in the converging wedge channels. This results in increases in fluid pressure, especially near the trailing end of the wedge channels. If the rotating element moves toward the non-rotating element, the convergence angle of the wedge channel increases, causing the fluid pressure rise along the channel to increase. Conversely, if the rotating element moves away, the pressure rise along the wedge channel decreases. Thus, the fluid in the wedge channels exerts restoring forces on the rotating element that vary with and stabilize running clearances and prevent contact between the rotating and non-rotating elements of the bearing. Flexing and sliding of the foils causes coulomb damping of any axial or overturning motion of the rotating element of the bearing.

Owing to preload spring forces or gravity forces, the rotating element of the bearing is typically in physical contact with the fluid foil members of the bearing at low rotational speeds. This physical contact results in bearing wear. It is only when the rotor speed is above what is termed the lift-off/touch-down speed that the fluid dynamic forces generated in the wedge channels assure a running gap between the rotating and non-rotating elements.

Compliant foil fluid film radial bearings typically rely on backing springs to preload the fluid foils against the relatively movable rotating element so as to control foil position/nesting and to establish foil dynamic stability. The bearing starting torque (which should ideally be zero) is directly proportional to these preload forces. These preload forces also significantly increase the rotor speed at which the hydrodynamic effects in the wedge channels are strong enough to lift the rotating element of the bearing out of physical contact with the non-rotating members of the bearing. These preload forces and the high lift-off/touch-down speeds result in significant bearing wear each time the rotor is started or stopped.

Conventional compliant foil fluid film radial bearings operate with extremely small running clearances and moderate, as opposed to low, drag and power consumption. The clearances between the non-rotating fluid foil's converging channel ramp trailing ends and the rotating element are typically less than 100 micro-inches at operating conditions.

While most prior compliant foil fluid film radial bearings utilize a plurality of individual compliant foils and individual spring foils with a cylindrically bored bushing, there are instances where a single compliant foil and a single spring foil have been proposed with a cam shaped or lobed bushing. An example of this type of radial bearing can be found in U.S. Pat. No. 5,427,455 issued Jun. 27, 1995 to Robert W. Bosley, entitled "Compliant Foil Hydrodynamic Fluid Film Radial Bearing".

SUMMARY OF THE INVENTION

The present invention is directed to a multi-segment radial bearing generally comprising a bushing, a shaft or rotor, a plurality of compliant foils, and a like plurality of foil undersprings.

The interior bore of the bushing includes a plurality of anti-rotation retainers that are equally spaced and extend the axial length of the interior bore, which may be either cylindrical or contoured. These generally T-shaped retainers divide the interior bore of the bushing into a like plurality of lobes, with each lobe having a compliant foil and foil underspring disposed therein between adjacent generally T-shaped retainers.

BRIEF DESCRIPTION OF THE DRAWINGS

Figure 1:
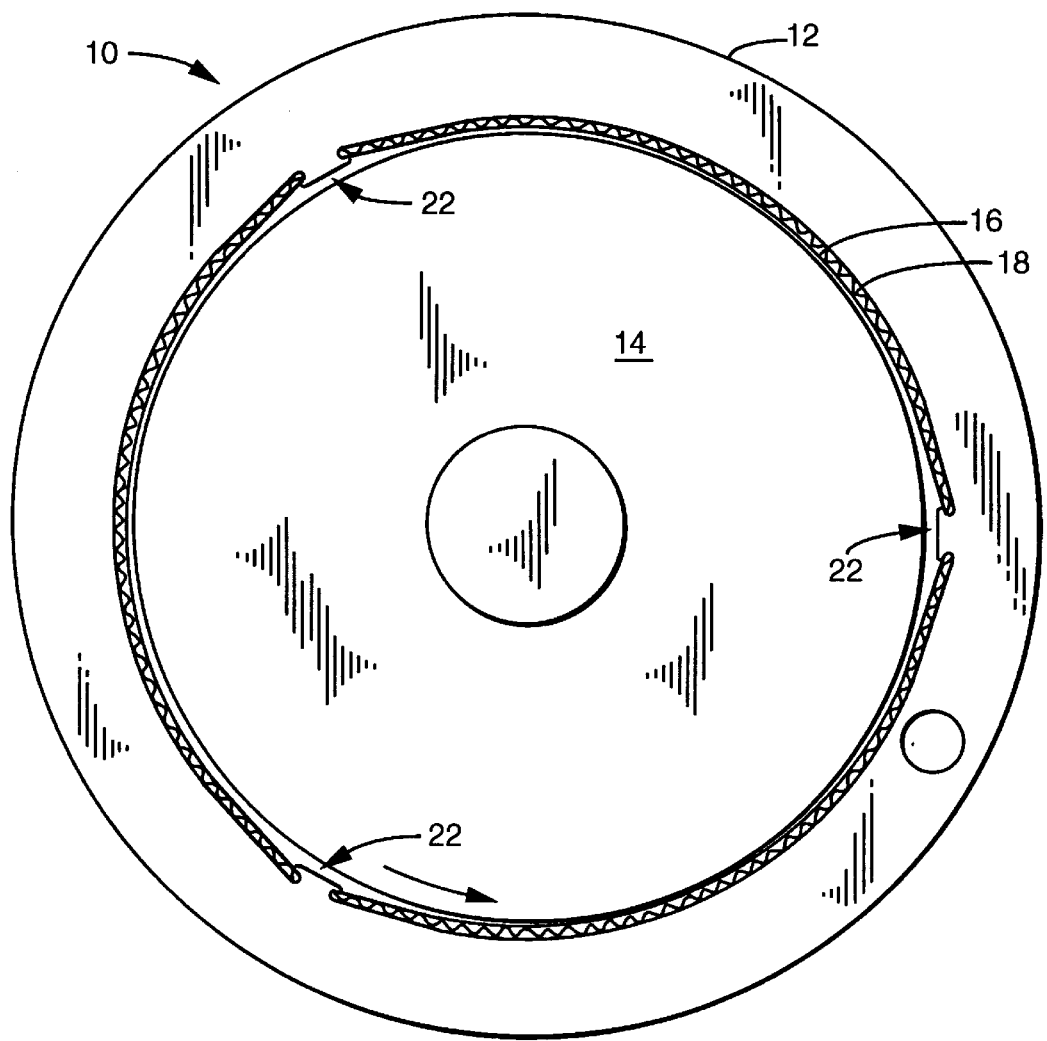
Figure 2:
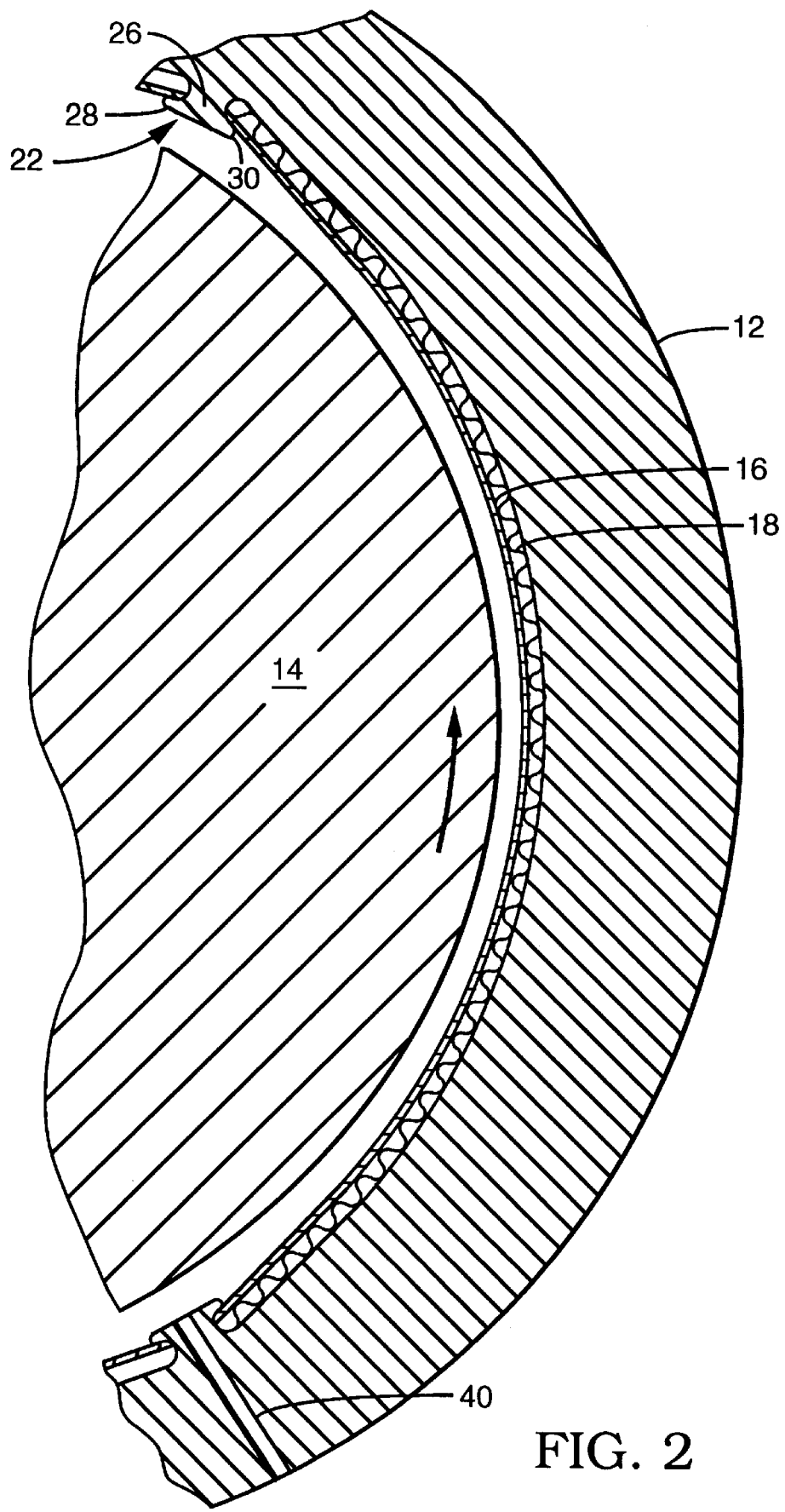
Figure 3:
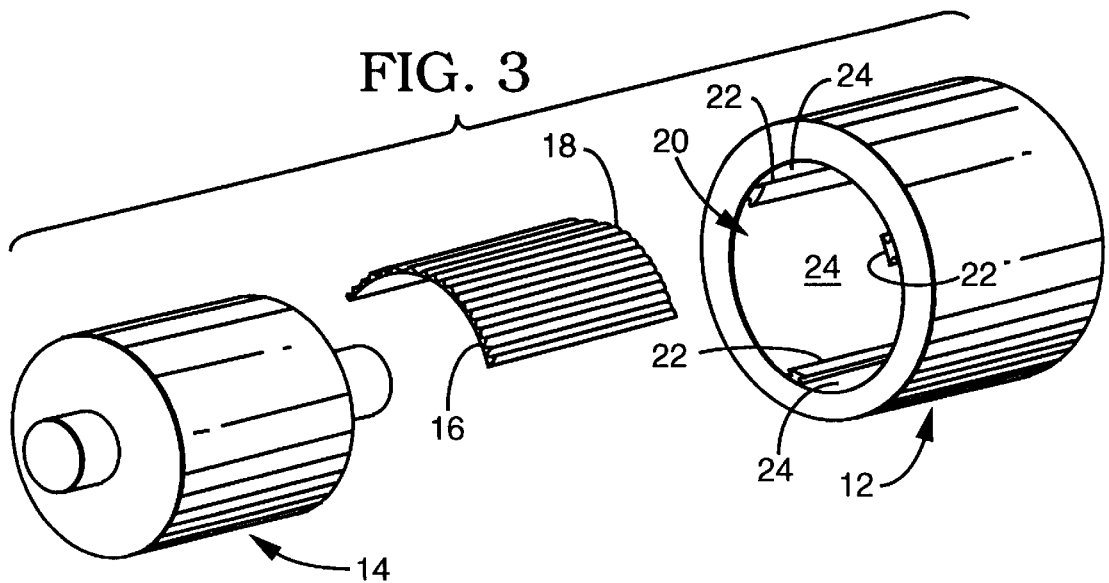
Figure 4:
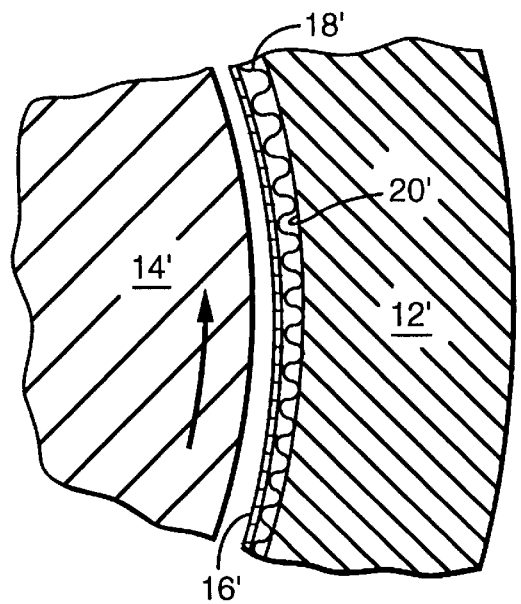

Having thus described the present invention in general terms, reference will now be made to the accompanying drawings in which:

FIG. 1 is an end view of the compliant foil fluid film radial bearing of the present invention;

FIG. 2 is an enlarged sectional view of a portion of the compliant foil fluid film radial bearing of FIG. 1;

FIG. 3 is an exploded perspective view of the compliant foil fluid film radial bearing of FIGS. 1 and 2; and FIG. 4 is an enlarged sectional view of a portion of an alternate compliant foil fluid film radial bearing of the present invention.

DETAILED DESCRIPTION OF THE PREFERRED EMBODIMENTS

Illustrated in FIGS. 1–3 is the compliant foil fluid film radial bearing 10 of the present invention. This multi-segment radial bearing 10 generally comprises a bushing 12, a shaft or rotor 14, a plurality of compliant foils 16 (shown as three), and a like plurality of foil undersprings 18.

The interior bore 20 of the bushing 12 includes a plurality of anti-rotation devices or retainers 22 (shown as three, generally T-shaped retainers) which are equally spaced and extend the axial length of the interior bore 20. The retainers 22 divide the interior bore 20 of the bushing 12 into a like plurality of lobes 24. The compliant foils 16 and the foil undersprings 18 are disposed in each lobe 24 between adjacent generally T-shaped retainers 22.

While the shaft or rotor 14 is cylindrical, the interior bore 20 of the bushing 12 may or may not be cylindrical. If the interior bore 20 is not cylindrical, the generally T-shaped retainers 22 will divide the interior bore 20 into a plurality of shaped or contoured lobes 24.

On the other hand, if the interior bore 20' of the bushing 12' is cylindrical, the generally T-shaped retainers will divide the interior bore 20' into a plurality of equally spaced arc segments of a cylinder and the converging wedges will be formed via the compliant foil 16' and/or the foil undersprings 18' as generally shown in FIG. 4. The height of the foil undersprings 18' may increase from the leading edge of the compliant foil 16' to the trailing edge of the compliant foil 16' in order to form the converging wedge. Alternately, the stiffness of the foil underspring can vary from the leading edge to the trailing edge to produce the same result, or shims of varying height can be positioned underneath the foil underspring.

The generally T-shaped retainers 22 may be symmetrical or conform to the leading edge and trailing edge of the contoured lobes 24. Non-symmetrical T-shaped retainers 22 will retain the foils 16 at different radii from the geometric center with the leading edge of the foils retained at a greater geometric radius than the trailing edge.

The generally T-shaped retainers 22 are formed as part of the contoured interior bore 20 of the bushing 12 with the base 26 thereof extending radially inwards from the interior bore 20. The cross piece of the generally T-shaped retainers 22 has a leading edge 30 and a trailing edge 28, with the leading edge 30 having a greater thickness or width than the trailing edge 28 as best shown in FIG. 2. Since the inner diameter of the cross piece is the same at both the leading edge 30 and the trailing edge 28, this provides a greater diameter or depth for the trailing edge of the contoured lobe 24 which is under the thicker leading edge 30 of the generally T-shaped retainers 22.

The contoured surface of the lobes 24 can be derived from one or a series of radii of a defined profile. For example, in the case of three (3) foil segments, the contour of the lobes 24 in which the compliant foils 16 and underspring foils 18 rest upon can be a multiple of, or a fraction of, a specific number. Also, an appropriate contour can be constructed from vertices of an equilateral triangle of specific length side with circles formed from these vertices intersecting to give the contoured surface which may be machined, ground, EDM'ed or broached.

While the compliant foil fluid film radial bearing 10 is shown with three (3) compliant foil segments 16 and three (3) foil undersprings 18, a greater number of compliant foils segments 16 and foil undersprings 18 can be utilized. For example, five (5) or more segments may be equally appropriate for the compliant foil fluid film radial bearing 10.

The compliant foils 16 and foil undersprings 18 are trapped and held between adjacent T-shaped retainers 22. The compliant foils 16 would normally have a preformed arcuate shape as shown in FIG. 3. The foil undersprings 18 may have a preformed radius or simply be a rectangular sheet. In either case, the compliant foils 16 and foil undersprings 18 are axially inserted, either separately or together, into the interior bore 20 of bushing 12 between adjacent T-shaped retainers 22. Also, while the foil undersprings 18 are illustrated as a wavy springform, any conventional bearing underspring can be utilized, including the spring described in U.S. Pat. No. 5,427,455. The underspring 18 may have variable spring rates or tapered heights from the leading edge to the trailing edge as shown in FIG. 4.

When trapped between adjacent T-shaped retainers 22, the compliant foils 16 would be pre-loaded in compression between the adjacent T-shaped retainers 22. In some instances, however, the compliant foils 16 may be merely retained in position between adjacent T-shaped retainers 22 without preloading. The foil undersprings 18 would, however, normally be pre-loaded in compression between adjacent T-shaped retainers 22. The foil underspring 18 may contribute to the contoured shape of the compliant foils 16. In most instances, the compliant foils 16 and foil underspring 18 would be separate and would be capable of sliding movement therebetween. There may, however, be instances where the compliant foils 16 and foil underspring 18 will be joined together into a single assembly.

The greater thickness of the leading edge 30 of the T-shaped retainer crosspiece produces a greater depth at the trailing edge of the compliant foils 16 to serve as a means to pull the compliant foils 16 away from the trailing edge of the converging wedge. The trailing edge 28 of the T-shaped retainers 22 has less thickness thereby allowing the leading edge of the foils to rest closer to the shaft, which will facilitate development of the fluid film wedges.

Also, while the complaint foil fluid film radial bearing 10 can function hydrodynamically, by providing an external source of fluid under pressure, a hydrostatic aspect can be realized. The external pressurized fluid may be introduced axially at the ends of the bushing or through radial holes 40 in the bushing 40 axially along and through the T-shaped retainers 22. The hydrostatic aspect will provide cooling fluid to the interior bore 20 of the bushing 12, which will increase bearing life especially in a gas turbine application. Hydrostatic operation will also increase the load capacity of the bearing.

The radial bearing 10 of the present invention allows for automation by mass production and the components can easily be assembled by hand. The compliant foils 16 may be stamped or fine blanked and there is no requirement for spot welding or chemical etching. The large clearances between the compliant foils 16 and the shaft 14 at the T-shaped retainers 22 allow improved cooling of the shaft 14 and compliant foils 16. The design can accommodate a variety of underspring types and the T-shaped retainers 22 permit more design flexibility with respect to the shaft, foil and spring interaction.

While specific embodiments of the invention have been illustrated and described, it is to be understood that these are provided by way of example only and that the invention is not to be construed as being limited thereto but only by the proper scope of the following claims.

What I claim is:

1. A compliant foil fluid film radial bearing comprising:
   a bushing having an interior bore including a plurality of equally spaced generally T-shaped retainers axially extending in said interior bore and a like plurality of lobes between adjacent generally T-shaped retainers;
   a shaft rotatably supported within said interior bore of said bushing;
   a plurality of compliant foils, with an individual compliant foil disposed in said interior bore of said bushing between adjacent generally T-shaped retainers; and
   a plurality of foil undersprings, with an underspring disposed beneath each of said compliant foils between adjacent generally T-shaped retainers.

2. The compliant foil fluid film radial bearing of claim 1 wherein said interior bore is cylindrical and said individual compliant foils and said individual foil undersprings beneath said individual complaint foils establish a converging wedge between adjacent generally T-shaped retainers.

3. The compliant foil fluid film radial bearing of claim 1 wherein said interior bore is non-cylindrical, generally contoured lobes are formed between adjacent generally T-shaped retainers, and said individual compliant foils and said individual foil undersprings generally conform to the shape of said contoured lobes to establish a converging wedge.

4. A compliant foil fluid film radial bearing comprising:
   a bushing having a cylindrical interior bore including a plurality of equally spaced retainers axially extending into said interior bore and a like plurality of arc segments between adjacent retainers;

a shaft rotatably supported within said interior bore of said bushing;

a plurality of compliant foils, with an individual compliant foil disposed in said interior bore of said bushing in each arc segment between adjacent retainers; and a plurality of foil undersprings, with an underspring disposed beneath each of said compliant foils in each arc segment between adjacent retainers, the radial height of said foil undersprings increasing form its leading edge to its trailing edge to establish a converging wedge on the surface of said compliant foil facing said shaft.

5. The compliant foil fluid film radial bearing of claim 4 wherein said retainers are generally T-shaped.

6. The compliant foil fluid film radial bearing of claim 5 wherein said generally T-shaped retainers are symmetrical.

7. The compliant foil fluid film radial bearing of claim 5 wherein said generally T-shaped retainers are asymmetrical.

8. The compliant foil fluid film radial bearing of claim 7 wherein said generally T-shaped asymmetrical retainers have a crosspiece with a leading edge and a trailing edge, with the leading edge thicker than the trailing edge.

9. The compliant foil fluid film radial bearing of claim 4 wherein the radial stiffness of said foil undersprings increases form its leading edge to its trailing edge.

10. The compliant foil fluid film radial bearing of claim 9 wherein said bearing is hydrodynamic.

11. The compliant foil fluid film radial bearing of claim 9 wherein said retainers are generally T-shaped.

12. The compliant foil fluid film radial bearing of claim 9 wherein said bearing is hydrostatic.

13. A compliant foil fluid film radial bearing comprising:

a bushing having a non-cylindrical interior bore including a plurality of equally spaced retainers axially extending into said interior bore and a like plurality of contoured lobes between adjacent retainers;

a shaft rotatably supported within said interior bore of said bushing;

a plurality of compliant foils, with an individual compliant foil disposed in said interior bore of said bushing in each contoured lobe between adjacent retainers; and a plurality of foil undersprings, with an underspring disposed beneath each of said compliant foils in each contoured lobe between adjacent retainers, the contour of each lobe between adjacent retainers establishing a converging wedge on the surface of said compliant foil facing said shaft.

14. The compliant foil fluid film radial bearing of claim 13 wherein said generally T-shaped retainers are symmetrical.

15. The compliant foil fluid film radial bearing of claim 14 wherein said generally T-shaped asymmetrical retainers have a crosspiece with a leading edge and a trailing edge, with the leading edge thicker than the trailing edge.

16. The compliant foil fluid film radial bearing of claim 13 wherein said generally T-shaped retainers are symmetrical.

17. The compliant foil fluid film radial bearing of claim 13 wherein said generally T-shaped retainers include radial openings to provide cooling flow to said interior bore of said bushing.

18. The compliant foil fluid film radial bearing of claim 13 and in addition means to provide cooling flow axially into said interior bore of said bushing.

* * * * *

UNITED STATES PATENT AND TRADEMARK OFFICE
CERTIFICATE OF CORRECTION

PATENT NO : 5,915,841
DATED : June 29, 1999
INVENTOR(S) : Dennis H. Weissert

It is certified that error appears in the above-identified patent and that said Letters Patent is hereby corrected as shown below:

Claim 16, line 2, change "symmetrical" to --asymmetrical--

Signed and Sealed this

Thirteenth Day of June, 2000

Attest:

Q. TODD DICKINSON

*Attesting Officer*  *Director of Patents and Trademarks*